No. 656,496. Patented Aug. 21, 1900.
G. F. APPLETON.
OPTICAL DEVICE.
(Application filed Dec. 4, 1899.)
(No Model.)
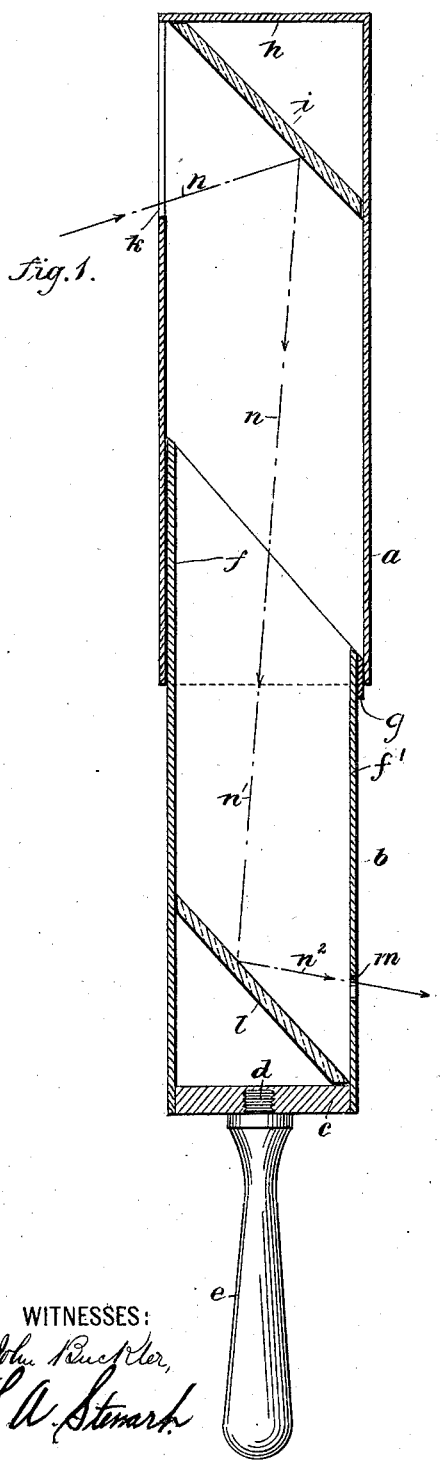
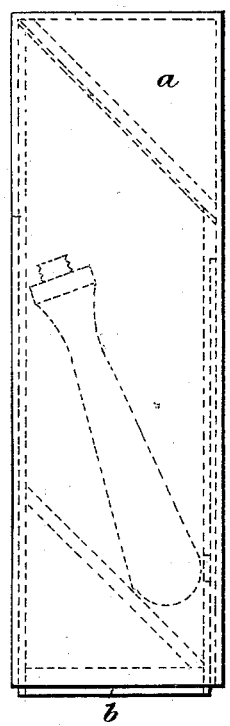
WITNESSES:
John Buckler,
F. A. Stewart.
INVENTOR
George F. Appleton.
BY
Edgar Tate & Co
ATTORNEYS
THE NORRIS PETERS CO., PHOTO-LITHO., WASHINGTON, D. C.

UNITED STATES PATENT OFFICE.

GEORGE FREDERICK APPLETON, OF HAVERSTRAW, NEW YORK.

OPTICAL DEVICE.

SPECIFICATION forming part of Letters Patent No. 656,496, dated August 21, 1900.

Application filed December 4, 1899. Serial No. 739,077. (No model.)

*To all whom it may concern:*

Be it known that I, GEORGE FREDERICK APPLETON, a citizen of the United States, residing at Haverstraw, in the county of Rockland and State of New York, have invented certain new and useful Improvements in Optical Devices, of which the following is a full and complete specification, such as will enable those skilled in the art to which it appertains to make and use the same.

This invention relates to optical devices, and has for its object to provide a device which may be held in the hand by a person desirous of viewing an object, a person, a pageant, or parade, even though the user of the device be upon the same horizontal plane therewith and though the same be concealed from his direct line of vision by intervening objects or a crowd of persons.

My invention consists in the construction and arrangement of parts hereinafter fully described.

In the accompanying drawings, in which like reference characters denote like parts in the several views, Figure 1 is a horizontal section of an optical device constructed according to my invention, the parts being shown in extended or operative position and the handle in elevation. Fig. 2 is a side view thereof, the parts being shown telescoped or collapsed.

In the practice of my invention I provide a casing consisting of two members $a$ and $b$, each of which is preferably oblong in form and rectangular in cross-section, the member $a$ being of sufficiently-greater internal dimensions than the member $b$ that the latter member may be housed therein, thus telescoping said members. The member $a$ is provided at one end with a partition or cap $c$, which is chambered and threaded to receive the similarly-threaded stud $d$ of a handle $e$, which may thus be detached from said cap $c$ and stored within the casing member $b$. The upper end of the latter casing member is beveled or cut off diagonally, so that its rear side $f$ projects appreciably higher than its forward side $f'$. The latter is provided upon the outer face with a cross-strip $g$, whereby when said beveled end is inserted into the member $a$ it is bound frictionally to said latter member. The upper end of the casing member $a$ is closed at $h$ and mounted transversely and obliquely of the member $a$, adjacent the closed end $h$ thereof, is a plane mirror $i$, the angle of mounting thereof being approximately forty-five degrees. One side of the member $a$ is apertured, as at $k$, throughout an extent coincident with the vertical depth of the mirror $i$. A mirror $l$ is arranged at the lower end of the member $b$ and so mounted at a similar angle that its upper or operative surface is parallel with and of equal superficial area to the lower or operative surface of the mirror $i$. A sight-opening $m$ is formed at one side of the member $b$ at a point preferably opposite the central portion of the mirror $l$.

The relative arrangement and construction of parts, as above described, is such that with the parts in the relative positions shown in Fig. 1, if the eye be applied to the sight-opening $m$, the mirrors $i$ and $l$ will present thereto an image of objects on the horizontal plane of the observer, as indicated by the dotted line $n$ $n'$ $n^2$, provided the object be at a distance corresponding to the base of a triangle whereof the hypotenuse is the line of incidence $n$ and the side the line of reflection $n'$, or by tilting the device according to the distance a wide range of vision is permitted. By the use of this invention the observer is enabled to look over an object which obscures direct vision, and the device becomes thus particularly valuable for viewing parallel and other spectacular exhibitions, a fair view of which is often obscured by crowds of sightseers.

The members $a$ and $b$ may be telescoped to any desired extent, according to requirement or according to the height of the user or the crowd in front of him, and the strip $g$ will by friction maintain said members in any relatively-adjusted position.

The shape of the end of the member $b$ is such that with the parts in the position shown in Fig. 2 the side $f$ thereof will cover the mirror $i$ and close the aperture $k$, and with the handle $e$ detached from the cap $c$ and housed within the member $b$ the entire device will be compact and portable.

I do not wish to be understood as limiting myself to the specific construction and arrangement of parts as above described, but reserve the right to vary the same within the scope of my invention.

Having fully described my invention, I claim as new and desire to secure by Letters Patent—

An optical device of the class described, comprising a casing consisting of two telescoping members, the lower of which is provided at its lower end with an obliquely-arranged mirror, the upper of which is provided at its upper end with a parallel member, said upper member being provided with an aperture at one side opposite the mirror mounted therein, and said lower member being provided at one side with a sight-opening opposite the mirror mounted therein, the upper end of said lower member being beveled to cover said mirror in said upper member, when said members are telescoped to close said aperture, substantially as shown and described.

In testimony that I claim the foregoing as my invention I have signed my name, in presence of the subscribing witnesses, this 1st day of December, 1899.

GEORGE FREDERICK APPLETON.

Witnesses:
 HENRY FURMAN,
 C. G. APPLETON.